United States Patent [19]

Goetz

[11] Patent Number: 5,124,858
[45] Date of Patent: Jun. 23, 1992

[54] DEMONSTRATION MIRROR CONSTRUCTION

[76] Inventor: Harold O. Goetz, 505 W. Third Ave., Dr., Broomfield, Colo. 80020

[21] Appl. No.: 743,954

[22] Filed: Aug. 12, 1991

[51] Int. Cl.⁵ .............................. G02B 5/08; G02B 7/18
[52] U.S. Cl. ..................................... 359/872; 359/881; 248/469; 248/474; 434/257
[58] Field of Search ................ 350/632, 639; 248/469, 248/473, 474, 476, 480, 494, 495; 359/871, 872, 881; 434/257

[56] References Cited

U.S. PATENT DOCUMENTS

| | | |
|---|---|---|
| 884,512 | 4/1908 | Ma . |
| 1,110,973 | 9/1914 | Tischler ............................. 350/632 |
| 1,584,105 | 5/1926 | Lenz .................................. 350/639 |
| 1,832,248 | 6/1929 | Schrader ........................... 350/632 |
| 3,148,461 | 8/1961 | Johnson ............................ 350/632 |
| 3,792,917 | 2/1974 | Martinez . |
| 3,970,374 | 7/1976 | Copp . |
| 4,138,083 | 2/1979 | Spiegel .............................. 248/474 |
| 4,605,291 | 8/1986 | Jolly ................................... 350/618 |
| 4,750,811 | 6/1988 | Beyer . |
| 5,015,084 | 5/1991 | Kryder .............................. 350/632 |

Primary Examiner—Bruce Y. Arnold
Assistant Examiner—R. D. Shafer
Attorney, Agent, or Firm—Henderson & Sturm

[57] ABSTRACT

A lightweight mirror demonstration device (10) for allowing the overhead remote viewing of a demonstration taking place on a table (100); wherein, the device (10) includes a mirror unit (11), a pair of transverse support units (12), and a pair of vertical support units (13) provided with clamp members (40) to grip the opposite edges of a table (100) to provide additional lateral support to the mirror demonstration device (10).

4 Claims, 3 Drawing Sheets

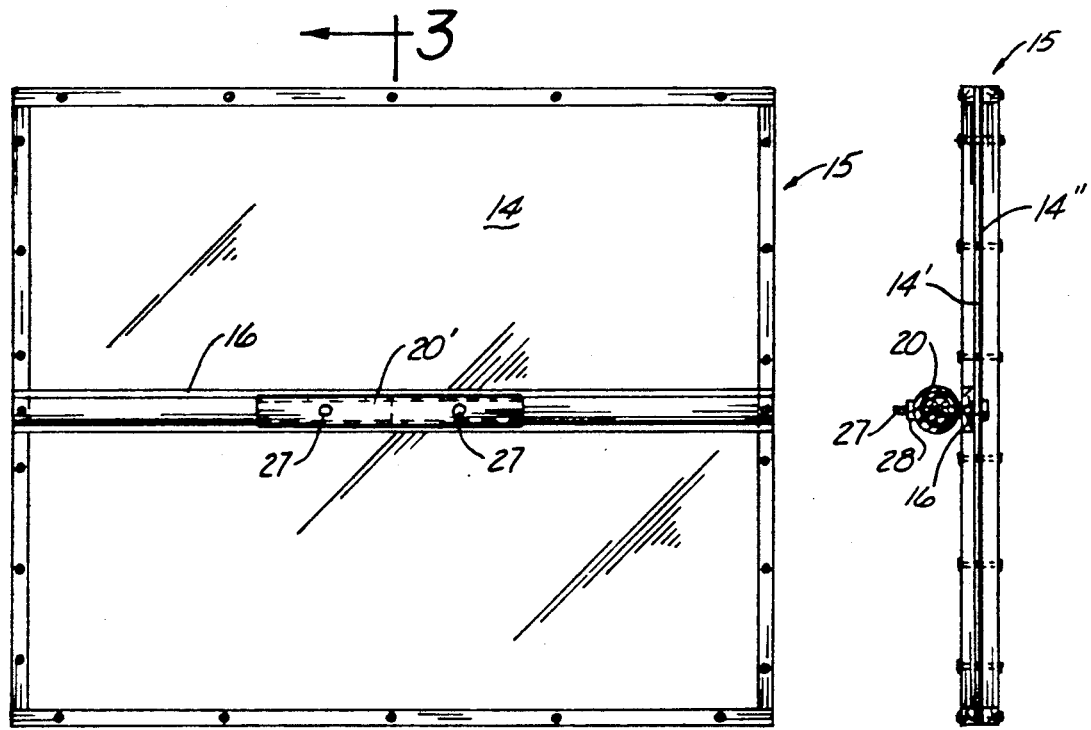
Fig. 2
Fig. 3
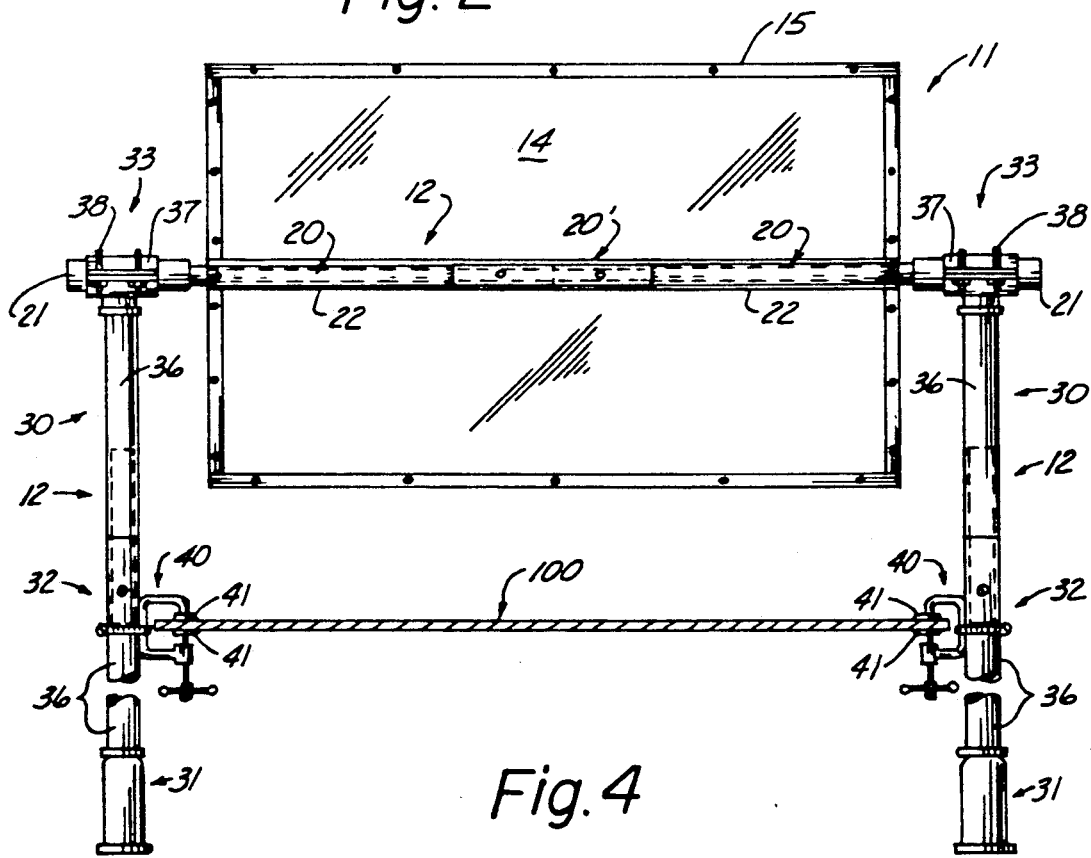
Fig. 4

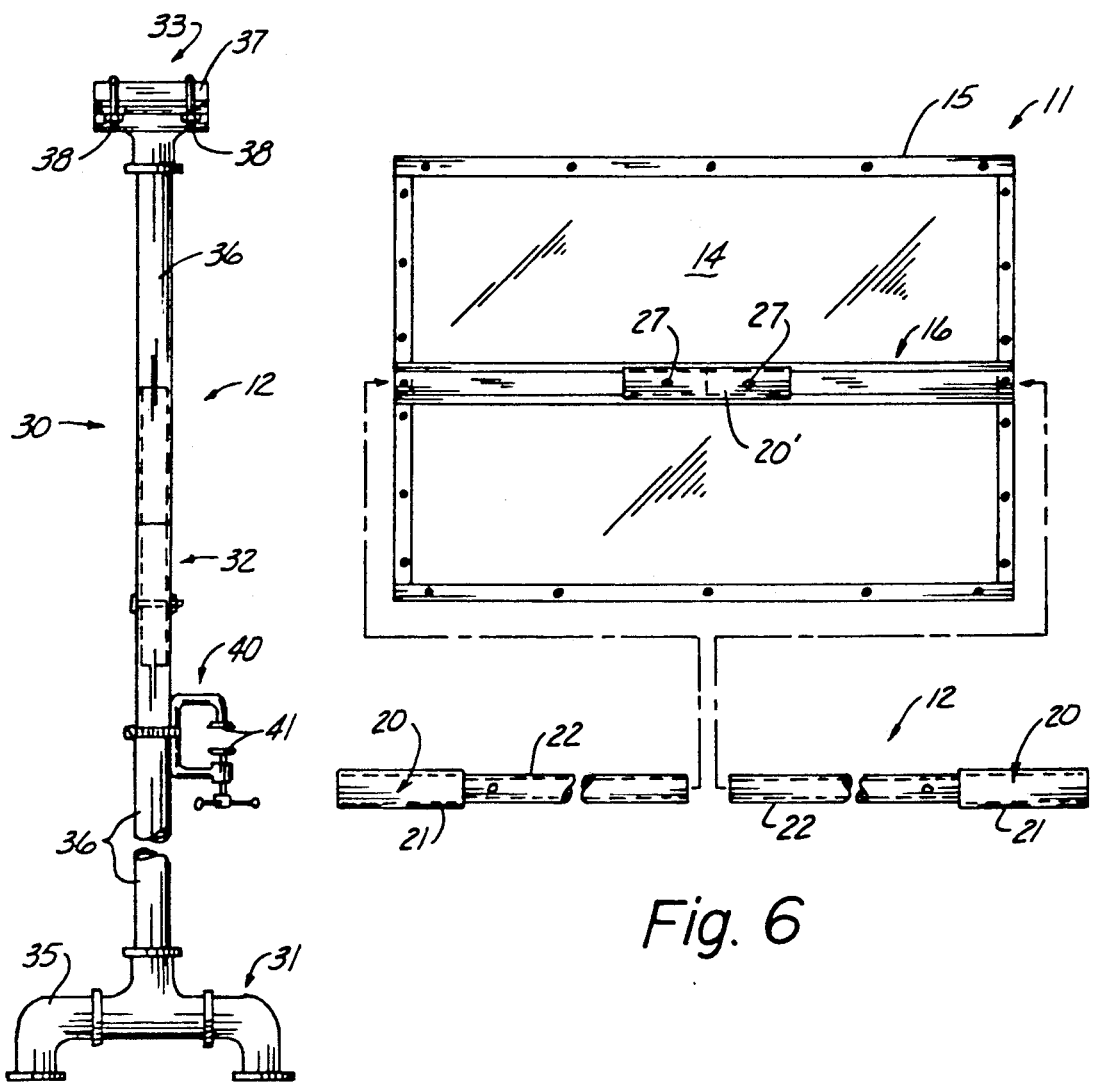
Fig. 5
Fig. 6
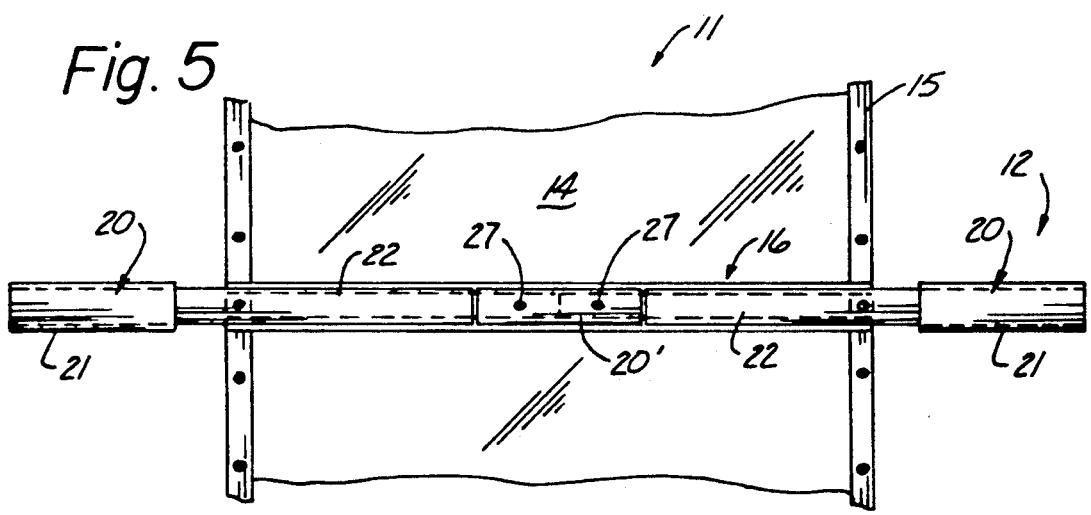
Fig. 7

DEMONSTRATION MIRROR CONSTRUCTION

TECHNICAL FIELD

The present invention relates to the field of rotatable mirror constructions in general, and in particular to a lightweight unbreakable rotatable mirror construction designed to aid in the remote viewing of a demonstration.

BACKGROUND ART

This invention was the subject matter of Document Disclosure Program Registration No. 265,915 filed in the united States Patent and Trademark Office on Oct. 29, 1990.

As can be seen by reference to the following U.S. Pat. Nos. 884,512; 3,792,917; 3,970,379; and 4,750,811; the prior art is replete with myriad and diverse demonstration mirror constructions.

While all of the aforementioned prior art constructions are more than adequate for the basic purpose and function for which they have been specifically designed, these prior art constructions are generally deficient in that their vertical supports have no provisions for stabilizing the construction relative to the table upon which the demonstration is being constructed. Furthermore, in those circumstances in which the construction is being used in narrow quarters it is often quite cumbersome to install the device to accurately reflect the demonstration. In addition, these prior art constructions normally employ a relatively heavy glass mirror which is subject to breakage.

As a consequence of the foregoing situation, there has existed a longstanding need for a new type of demonstration mirror, wherein the mirror surface is at least partially fabricated from a non-breakable polished metal surface; and, the provision of such a construction is a stated objective of the present invention.

DISCLOSURE OF THE INVENTION

Briefly stated, this invention comprises a demonstration mirror construction that utilizes a lightweight mirror member, as well as lightweight vertical support members and transverse securing members to support the mirror relative to a conventional horizontal surface.

As will be explained in greater detail further on in the specification, the construction may be used to aid in the remote viewing of a demonstration being performed on a conventional table, The mirror may be selectively rotated to a desired angle relative to the table to provide a remote overhead view of the demonstration that is taking place on the table.

In addition, this invention further contemplates the use of a lightweight non-breakable mirror member supported and suspended from a lightweight framework unit fabricated primarily from PVC tubing so that the mirror can be quickly assembled, installed and positioned relative to a demonstration table.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 2 is an isolated rear plan view of the mirror unit;

FIG. 3 is a cross-sectional view taken through line 3—3 of FIG. 2;

FIG. 4 is a rear plan view of all of the components of the mirror construction;

FIG. 5 is an isolated side view of one of the vertical support members;

FIG. 6 is an exploded perspective view of the engagement of the transverse securing member with the mirror member; and FIG. 7 is an enlarged detail view of the engagement between the transverse securing member and the mirror member.

BEST MODE FOR CARRYING OUT THE INVENTION

Figure 1:
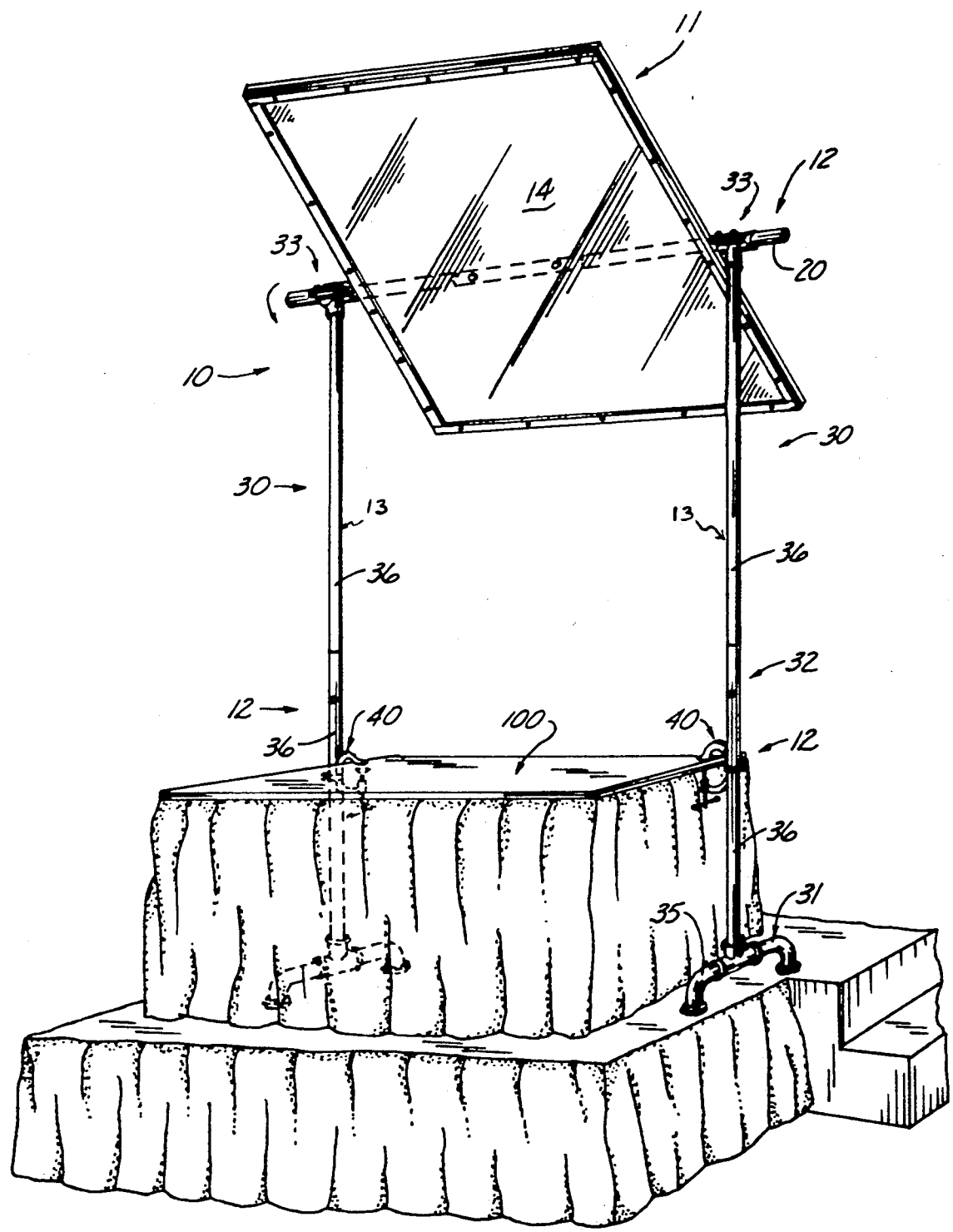
FIG. 1 is a perspective view of the mirror construction that forms the basis of the present invention.

As can be seen by reference to the drawings, and in particular to FIG. 1, the demonstration mirror construction that forms the basis of the present invention is designated generally by the reference numeral (10). The mirror construction (10) comprises in general a lightweight mirror unit (11), a transverse securing unit (12), and a pair of vertical support units (13). These units will now be described in seriatim fashion.

As shown in FIGS. 1 through 4, the mirror unit (11) comprises a mirror member (14) including a polished sheet of metal (14') such, as aluminum covered with a reflective mylar film 14" disposed within a mirror support framework (15). Framework (15) surrounds the periphery of the mirror member (14). Mirror member (14) is further provided with a mounting cross piece element (16) extending across the back of the mirror member (14). The purpose and function of the cross piece element (16) will be described presently.

As shown in FIGS. 4, 6 and 7, the transverse securing unit (12) comprises a pair of relatively elongated transverse support members (20) operatively associated with the vertical support units (13); and, a relatively short tubular transverse securing member (20') operatively attached to the mounting cross-piece element (16) which extends across the back of the mirror member (14).

Still referring to FIGS. 4, 6 and 7 it can be seen that each of the transverse support members (20) are further provided with an enlarged diameter outboard end (21) and a reduced diameter inboard end (22); wherein, the inboard ends (22) are further dimensioned to be received in the open ends of the tubular securing member (20').

Furthermore, as depicted in FIG. 3 the inboard ends (22) of the transverse support members (20) are adapted to be captively retained within the transverse securing member (20'), via elongated mounting bolts (27) which extend through: the mirror member (14); the mounting cross-piece element (16); and, both of the transverse support members (20); as well as, the transverse securing member (20'); wherein, the elongated mounting bolts (27) are further provided with locking nuts (28).

As can best be seen by reference to FIGS. 4 and 5, the pair of vertical support units (13) each comprise a vertical support member (30) having a lower base element (31) an intermediate elongated column element (32) and an upper journal element (33). In addition the base element comprises a pair of widely spaced lateral leg elements (35); and, the elongated column element (32) may comprise one or more tubular column sections (36) which may be either fixedly or adjustably connected relative to one another and to the base element (31) in a variety of well recognized manner.

As can also be seen by reference to FIGS. 4 and 5, the journal element (33) is operatively attached on the upper end of the vertical support member (30). Element (33) comprises a generally hollow cylindrical journal housing member (37) dimensioned to receive and rotatably support one end of the transverse support member (20). In addition, each of the journal housing members (37) are provided with clamping means (38) for selectively immobilizing the transverse support member (20) relative to the journal housing member (37) in a well recognized fashion.

Turning now to FIGS. 1, 4 and 5, it can be seen that each of the vertical support members (30) are further provided with auxiliary clamp members (40) which are vertically translatable relative to the intermediate column element (32); and further provided with clamping jaws (41) adapted to engage opposite edges of the table (100) to provide additional lateral support to the demonstration mirror device (10).

Having thereby described the subject matter of the present invention, it should be apparent that many substitutions, modifications and variations of the present invention are possible in light of the above teachings. It is therefore to be understood that the invention as taught and described herein is only to be limited to the extent of the breadth and scope of the appended claims.

I claim:

1. A lightweight demonstration mirror device for use in combination with a table to allow the remote overhead viewing of a demonstration taking place on the table; wherein, the device comprises:

an unbreakable mirror unit including a lightweight mirror member fabricated from a sheet of metal having a mirrored surface provided on one side a transverse securing unit comprising a pair of transverse support members operatively connected to the other side of said mirror member;

a pair of vertical support units wherein each vertical support unit includes: a lower base element; an intermediate column element; and, an upper journal element dimensioned to rotatably receive the opposite ends of said transverse securing unit; and a clamp member operatively connected on one end to said column element and provided on its other end with jaws that are moveable to captively engage an edge of said table.

2. The device as in claim 1; wherein, said mirrored surface comprises a covering of mirrored mylar.

3. The device as in claim 2,; wherein, said mirror unit further comprises a mirror support framework which surrounds the periphery of the mirror member and is provided with a mounting cross piece element which is operatively attached to the transverse support members.

4. The device as in claim 1; wherein, said transverse securing unit further comprises a tubular securing member attached to the other side of said mirror member and dimensioned to receive the opposed ends of said pair of transverse support members.

* * * * *